Aug. 25, 1942.                L. O. RAU                2,294,205
                            BEAN CULTIVATOR
                         Filed Aug. 7, 1941            2 Sheets-Sheet 2
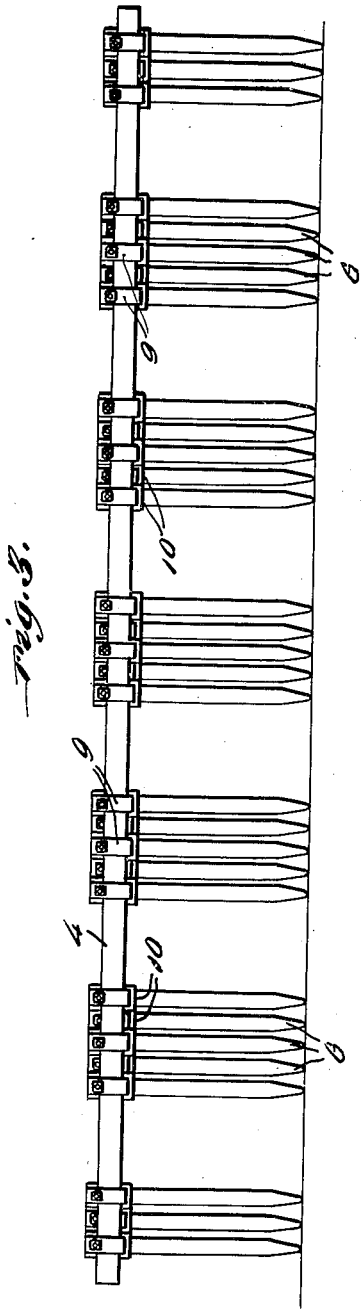
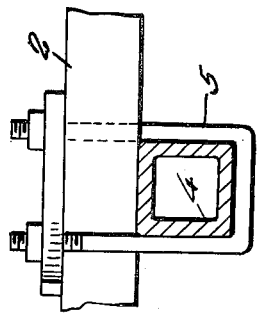
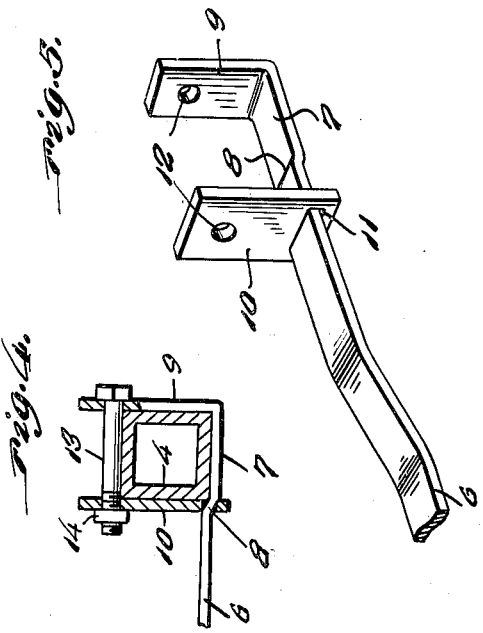
Inventor
Linn O. Rau
By Clarence A. O'Brien
Attorney Patented Aug. 25, 1942

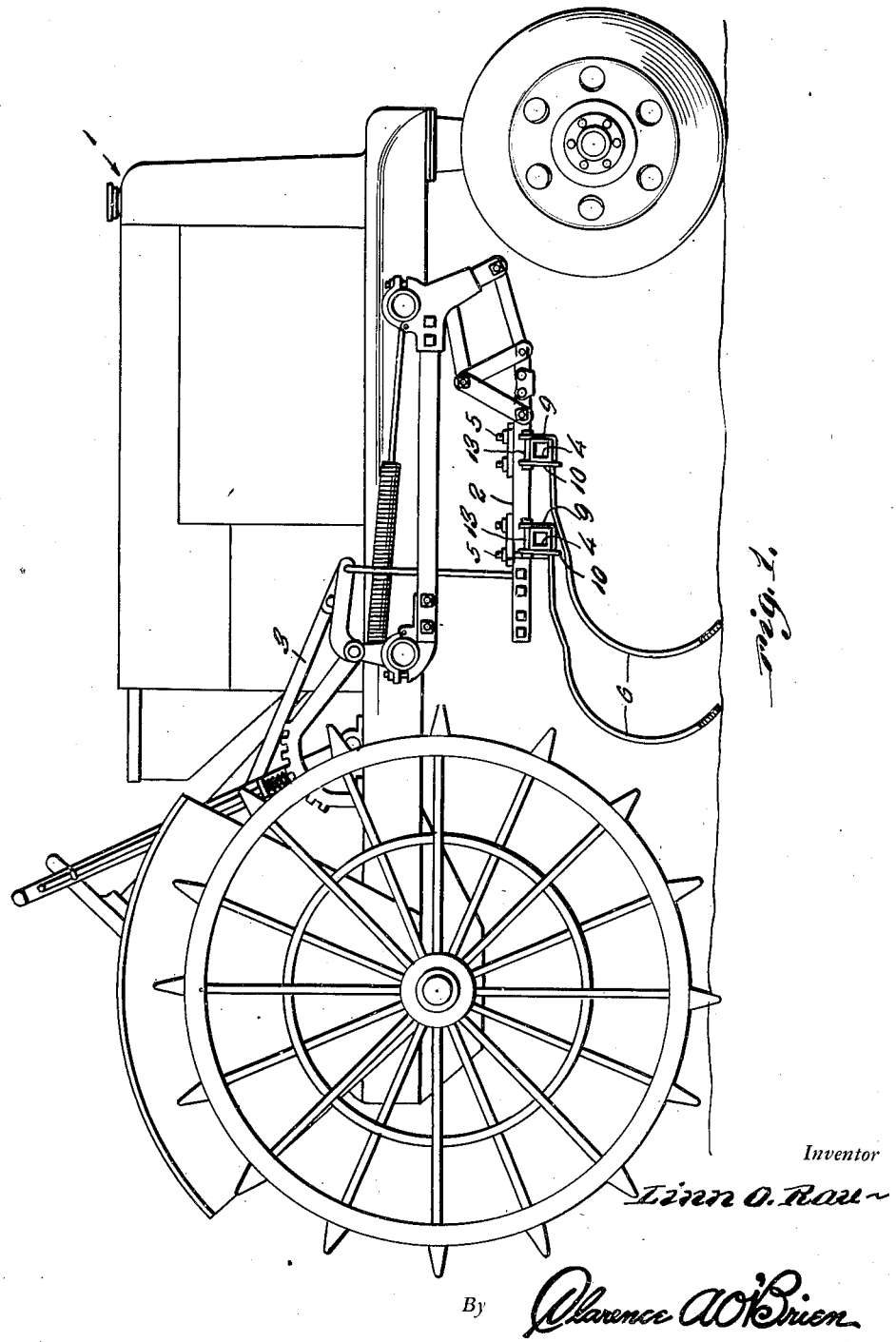

2,294,205

UNITED STATES PATENT OFFICE 2,294,205

BEAN CULTIVATOR

Linn O. Rau, Austin Township, Macon County, Ill.

Application August 7, 1941, Serial No. 405,856

1 Claim. (Cl. 55—36)

The present invention relates to new and useful improvements in bean cultivators and has for its primary object to provide, in a manner as hereinafter set forth, a device of this character which is adapted to be expeditiously mounted for operation on various types of tractor cultivators.

Another very important object of the invention is to provide a bean cultivator of the aforementioned character comprising spring teeth which may be conveniently adjusted and rigidly secured in any desired position.

Other objects of the invention are to provide a bean cultivator of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a tractor cultivator equipped with a bean cultivator in accordance with the present invention.

Figure 2 is a cross-sectional view through one of the transverse bars, showing the method of securing it to one of the tractor cultivator beams.

Figure 3 is a view in front elevation of the invention.

Figure 4 is a cross-sectional view, showing the means for adjustably securing the teeth of the bean cultivator in position.

Figure 5 is a perspective view of the end portion of one of the teeth which is secured to the transverse bar.

Referring now to the drawing in detail, it will be seen that reference numeral 1 designates generally a conventional tractor cultivator having mounted thereon for swinging movement in a vertical plane beams 2. The usual shanks and shovels have been removed from the tractor cultivator beams 2. A hand lift 3 is provided for the beams 2.

The embodiment of the invention which has been illustrated comprises a pair of bars 4 of any suitable metal. The bars 4 are substantially square in cross-section. Further, the bars 4 are secured transversely beneath the tractor cultivator beams 2 in spaced, parallel relation to each other through the medium of U bolts 5. This is shown to advantage in Figure 2 of the drawings.

Mounted for lateral adjustment to any desired position on the bars 4 are spring teeth 6. The spring teeth 6 include downwardly offset forward end portions 7 which are engageable beneath the bars 4, said portions 7 providing shoulders 8 which abut said bars 4. Then, the downwardly offset forward end portions 7 of the spring teeth 6 terminate in upturned stationary jaws 9 which are engageable with the forward sides of the bars 4.

Mounted on the spring teeth 6 at the shoulders 8 are what may be considered movable jaws 10. The movable jaws 10 are slidable on the spring teeth 6 and are provided, in their lower end portions, with transverse slots 11 through which said teeth pass. The upper portions of the jaws 9 and 10 are provided with openings 12 which receive bolts 13 for clamping said jaws on the bars 4.

It is thought that the operation of the invention will be readily apparent from a consideration of the foregoing. To install the bean cultivator, the usual shanks and shovels are removed from the tractor cultivator 1 and the tubular bars 4 are mounted on the beams 2 of said tractor cultivator. Of course, as the tractor cultivator 1 moves forwardly the spring teeth 6 engage and cultivate the ground in an obvious manner. The usual lifts of the tractor cultivator 1 permit the spring teeth 6 to be conveniently adjusted for depth as desired. By simply loosening the nuts 14 on the bolts 13, thereby loosening the movable jaws 10, the spring teeth 6 may be conveniently adjusted to any desired position on the bars 4. The shoulders 8 positively prevent forward movement of the spring teeth 6 on the bars 4.

It is believed that the many advantages of a bean cultivator constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A bean cultivator comprising a bar of substantially square cross-section, spring teeth adjustably mounted on said bar, said teeth including downwardly offset end portions engageable beneath the bar and terminating in upturned stationary jaws engageable with the bar, said offset portions providing shoulders engageable with the bar, a movable jaw slidably mounted on each tooth, and bolts connecting the stationary and movable jaws for clamping said jaws on the bar.

LINN O. RAU.